(No Model.)
F. G. ATKINSON.
WHEEL FOR VEHICLES.
No. 578,618. Patented Mar. 9, 1897.
Fig. 1.
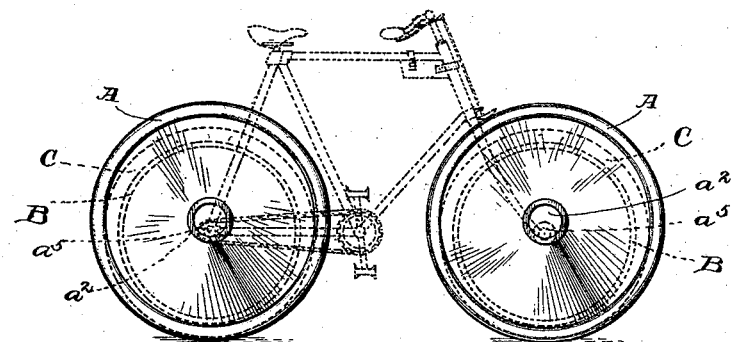
Fig. 2. Fig. 3. Fig. 4.
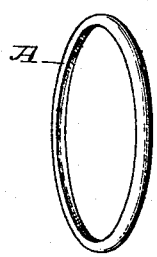 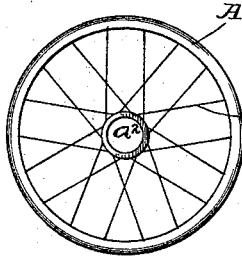 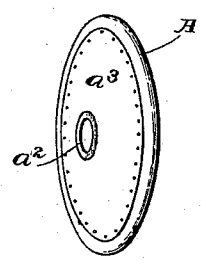
Fig. 5. Fig. 6.
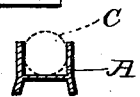 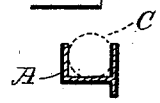
Fig. 7.
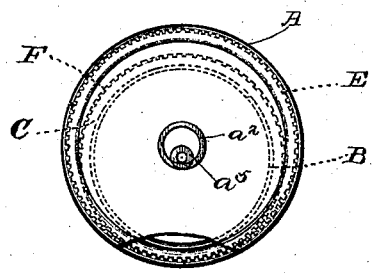
Witnesses:
F. S. Belt.
N. A. Kelly
Inventor:
Frederick G. Atkinson
By Bank & Co
his attorneys

UNITED STATES PATENT OFFICE.

FREDERICK G. ATKINSON, OF WASHINGTON, DISTRICT OF COLUMBIA.

WHEEL FOR VEHICLES.

SPECIFICATION forming part of Letters Patent No. 578,618, dated March 9, 1897.

Application filed December 9, 1896. Serial No. 615,019. (No model.)

*To all whom it may concern:*

Be it known that I, FREDERICK G. ATKINSON, a citizen of the United States, residing at Washington, in the District of Columbia, have invented certain new and useful Improvements in Bicycle or other Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to wheels designed for use on bicycles, carriages, cars, and other vehicles where it is desirable to afford a yielding or elastic support for the vehicle without subjecting a yielding or elastic tire or tread to dangers of injuries, such, for instance, as of puncturing when a pneumatic tire is used.

The objects of the invention are to provide a wheel designed particularly for use on bicycles and similar articles, though applicable to all wheeled vehicles, which shall be possessed of all the qualities of the ordinary pneumatic or elastic tread wheel, and will at the same time be rendered incapable of being injured in passing the vehicle over sharp or pointed objects and will have a tread unaffected by uneven or soft roads over which the wheel passes.

With these objects in view the invention consists, essentially, of a wheel having a yielding tire and a supplemental unyielding tire surrounding and unattached to the first, the two tires being adapted to rotate independently, whereby a protection against puncturing the yielding tire is provided. A wheel having a yielding tire and a supplemental unyielding tire surrounding and unattached to the first and having inclosing sides, the two tires being adapted to rotate independently, whereby a protection against puncturing the yielding tire and means for keeping clean the track formed by the outer tire are provided.

The invention is illustrated in the accompanying drawings, in which—

Figure 1 is a side elevation of a bicycle having my improved wheels applied thereto. Fig. 2 is a perspective view of a simple form of supplemental tire. Fig. 3 is a side elevation of one form of tire, the sides being formed of spokes. Fig. 4 is a perspective view of a supplemental tire having the space between the periphery of the supplemental tire inclosed. Figs. 5 and 6 are sectional views showing different forms of supplemental tires constructed in accordance with my invention, and Fig. 7 is a side view of a modified form of supplementary tire or shield and inner tire.

In the drawings, A represents the supplemental tire, of which the simplest form is shown in Fig. 2 of the drawings. The supplemental tire may be constructed of any suitable material, such as iron, steel, rubber, papier-mâché, or other substance which is not easily injured and which is not subject to rapid wear when used as a tire of a wheel. The inner face of the supplemental tire A is provided with an interior continuous indentation extending around the tire, and this continuous indentation is designed to receive the periphery of the tire C of a wheel B, which latter tire is preferably, as shown in Fig. 1 of the drawings, one of the ordinary pneumatic or other yielding tires commonly used on bicycles and other vehicles. The supplemental tire is slightly greater in diameter than the tire of the wheel to which it is applied, so that the inner wheel will bear upon the inner face of the supplemental tire only at one point, namely, at a point near one which would be struck by a vertical line drawn through the axle of the wheel to which the supplemental tire is applied.

In order that the supplemental tire may be retained in position on a wheel to which it is applied without danger of displacement, the same may be provided with sides formed of spokes, as shown in Fig. 3, or the sides may be solid, as shown in Fig. 4. In case of utilization of the spokes $a$, as shown in Fig. 3, they are attached at each side of the supplemental tire and extend inward to a hub-ring $a^2$, which hub-rings have openings therein of a size to inclose the axle of the wheel to which the supplemental tire is applied and to permit the independent rotation of the supplemental tire and the wheel without contact of the axle with the hub-rings, thereby avoiding friction at this point.

A supplemental tire of the kind described and applied to a wheel will form a practical shield or armor for the inner elastic wire, and will also provide a rigid and unyielding tread for the inner wheel. In order that the tread thus formed may be free from dust, dirt, or articles which might injure the inner tire, I preferably inclose the spaces between the periphery and the hub-rings of the supplemental tire with solid plates $a^3$, one arranged on each side of the inner wheel, as shown in Fig. 4 of the drawings. These inclosing plates $a^3$ may be of any suitable material, and as their function is simply to exclude dust, dirt, and the like they may be of the lightest character, thus avoiding objection to them in their use in connection with the supplemental tire. The plates are preferably attached by screws or the like, permitting ready removal and replacement.

When the form of supplemental tire having the inclosing plates or sides, as shown in Fig. 4, is employed, the axle of the latter is preferably provided with washers $a^5$, arranged one on each end of the axle outside the respective sides. The washers $a^5$ are arranged to revolve freely on the axle, and therefore no undue friction which might retard the movement of the wheel is caused at this point.

The form in cross-section of the supplemental tire may be changed at will to conform with the use to which it is applied. For instance, as shown in Figs. 5 and 6 of the drawings, it may be provided on one or both sides with circumferential flanges designed to retain the tire in position on a railroad-track. The exterior bearing-surface of the supplemental tire may of course be of any width, thereby adapting it for use on heavy vehicles, wherein an interior yielding tire is employed and an exterior broad bearing is necessary to prevent the tire from being pressed into the ground over which the vehicle is moved.

A modified form of both the wheel-tire employed and of the supplemental tire is shown in Fig. 7 of the drawings. In this form the inner face of the supplemental tire is provided with a continuous series of teeth or cogs E of any desired shape, and the bearing-face of the inner wheel is provided with a similar series of teeth F. The teeth of the respective series intermesh and thereby the slipping of the wheel on its tread is prevented, insuring the utilization of all the power applied to move the vehicle to which the wheel is applied.

From the foregoing it will be clear that by my invention I provide means whereby an interior yielding or elastic tire may be used and whereby there will constantly be provided a track for the yielding tire, which track by reason of its rigidity will not be affected by unevenness or obstructions in a road, and whereby all the advantages of a yielding tire on a vehicle can be obtained without danger of injury by puncture or otherwise.

Although I have particularly described my invention in connection with a yielding or elastic tire it will be clear that it may with advantage be applied to wheels having the ordinary hard unyielding metal tires.

When brakes are arranged upon bicycles or other vehicles to which my wheels are attached, the brake-shoe is applied to the outer or supplemental tire, and thus there is no abrasion to the inner tire when the latter is of the pneumatic or other like type liable to rapid wear.

Having thus described my invention, what I claim as new, and desire to secure by Letters Patent, is—

1. A wheel having a yielding tire and a supplemental unyielding tire surrounding and unattached to the first, the two tires being adapted to rotate independently, whereby a protection against puncturing the yielding tire is provided, substantially as described.

2. A wheel having a yielding tire, and a supplemental unyielding tire surrounding and unattached to the first, and having inclosing sides, the two tires being adapted to rotate independently, whereby a protection against puncturing the yielding tire and means for keeping clean the track formed by the outer tire are provided, substantially as described.

In testimony whereof I affix my signature in presence of two witnesses.

FREDERICK G. ATKINSON.

Witnesses:
HARRY Y. DAVIS,
N. A. KELLY.